(12) United States Patent
Taunton

(10) Patent No.: US 7,526,045 B2
(45) Date of Patent: *Apr. 28, 2009

(54) MULTI-TONE TRANSMISSION

(75) Inventor: Mark Taunton, Milton (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/593,101

(22) Filed: Nov. 6, 2006

(65) Prior Publication Data

US 2007/0053458 A1    Mar. 8, 2007

Related U.S. Application Data

(63) Continuation of application No. 09/921,756, filed on Aug. 6, 2001, now Pat. No. 7,133,443.

(51) Int. Cl.
*H04L 27/04*    (2006.01)
*H03C 1/00*     (2006.01)

(52) U.S. Cl. .................................. 375/295; 332/150

(58) Field of Classification Search ................. 375/219, 375/222, 224, 260, 262, 265, 268, 295, 296, 375/300; 332/149–151, 160, 161
See application file for complete search history.

(56) References Cited

U.S. PATENT DOCUMENTS 4,679,227 A    7/1987    Hughes-Hartogs 5,768,318 A    6/1998    Mestgagh
6,175,551 B1 *  1/2001   Awater et al. ............... 370/210
6,240,141 B1   5/2001    Long
2002/0191705 A1 * 12/2002 Melsa et al. ................ 375/295

FOREIGN PATENT DOCUMENTS

| EP | 0 719 001 A1 | 6/1996 |
| EP | 0 961 515 B1 | 12/1999 |
| EP | 1 198 088 A1 | 4/2002 |
| WO | WO 99/18662 | 4/1999 |

OTHER PUBLICATIONS

European Search Report issued May 4, 2006 for Appl. No. EP 02255458, 3 pages.
"Low-Power ADSL Central-Office Line Drive," Texas Instruments, Dallas, Texas, Apr. 1999—Revised May 2001, pp. 1-31.

* cited by examiner

*Primary Examiner*—Young T. Tse
(74) *Attorney, Agent, or Firm*—Sterne, Kessler, Goldstein & Fox, P.L.L.C.

(57) ABSTRACT

A Multi-tone transmission system processes input data through a plurality of intermediate processing stages 12, 14, 16 and corresponding stages of intermediate data 18,20. A symbol including a number of tones is obtained therefrom by an inverse Fourier transform 24 and stored in a buffer 158. The peak amplitude that the symbol would contain after the subsequent processing in the analogue front end 146 is modelled and compared with a threshold. If the modelled peak amplitude in the symbol exceeds the threshold, the symbol stored in the buffer 158 is regenerated. The symbols stored in the buffer are output through the analogue front end 146.

21 Claims, 3 Drawing Sheets

MULTI-TONE TRANSMISSION

CROSS REFERENCE TO RELATED APPLICATIONS

This application is a continuation of U.S. patent application Ser. No. 09/921,756, entitled "Multi-Tone Transmission," filed Aug. 6, 2001, now U.S. Pat. No. 7,133,443 which is incorporated by reference herein in its entirety. Two commonly assigned patent applications in the name Mark Taunton, each also entitled "Multi-Tone Transmission," with Application Ser. No. 09/921,758, filed Aug. 6, 2001, now U.S. Pat. No. 7,075,978 and Ser. No. 09/921,757, filed Aug. 6, 2001, now U.S. Pat. No. 7,020,188, are incorporated herein by reference in their entireties.

FIELD OF INVENTION

The invention relates to multi-tone transmission, particularly for transmitting digital data.

BACKGROUND ART

A system using multiple tone signalling generally uses the Fourier Transform and its inverse to convert the information between time and frequency domains. Two examples of this type of modulation scheme are: (a) DMT (Discrete Multi-Tone) as used in systems such as ADSL (Asymmetric Digital Subscriber Loop); and (b) COFDM (Carrierless Orthogonal Frequency Division Multiplex), a standard widely adopted for digital terrestrial TV broadcasting.

In these systems, the data to be transmitted are sub-divided (multiplexed) across a number of distinct frequencies (sometimes also referred to as tones or sub-carriers) which are all integer multiples of a fixed basic frequency. The individual tones making up the group are spaced apart by this basic frequency. (In the case of COFDM the group of tones is then shifted up to a much higher frequency range for transmission from an aerial, but that detail is not relevant to the discussion here.) The number of tones used in different systems and within an individual system can vary, anywhere from 10 or so; e.g. for a low bandwidth ADSL upstream link, up to several thousand, e.g. an "8K-carrier" COFDM digital TV transmission.

The key algorithm common to the communication systems under consideration is the Fourier Transform, a mathematical scheme in which a time-varying signal is represented not as a set of values in time but as the sum of a set of sinusoidal waveforms. Each sinusoid in the set has a distinct frequency which is an integer multiple of a base frequency called the analysis frequency. Fourier Transform theory shows that any varying signal can be alternately represented in this way, by defining the unique set of amplitude and phase values for the individual sinusoids which sum together to form the signal wave-shape.

In the general (continuous) case, the size of the set of sinusoids is infinite and the spacing of the individual frequencies is infinitesimal. However the particular type of Fourier Transform used in practical communications systems is the Discrete Fourier Transform (DFT). The term 'discrete' is used because the data is processed as a set of distinct samples, not a continuous signal. When a finite sequence of samples is transformed in this way, the size of the set of sinusoids that represent the signal in the frequency domain is also finite. Hereafter, when the Fourier Transform is mentioned, the term 'discrete' should be assumed.

In summary, the normal ("forward") Fourier Transform is used to convert from a series of samples taken in the time domain into an equivalent representation of the same information, namely as a series of values in the frequency domain, describing the amplitude and phase of each of a set of harmonically related sinusoidal waveforms. The reverse process, the Inverse Fourier Transform, performs the opposite operation, summing the waveforms described by the individual amplitude and phase values to re-create a composite waveform as a series of samples in the time domain.

The Fourier Transform and its inverse are relatively complex functions, but they may be implemented without difficulty using well-known algorithms on a digital signal processor. In particular, highly efficient versions of the transforms are known, commonly called the Fast Fourier Transform (FFT) and the Inverse FFT or IFFT, which operate on sample sequences whose lengths are powers of 2, e.g. 256 points or 512 points.

The FFT and IFFT together provide for efficient encoding and decoding of signals. In a transmitter, a set of data bits may be encoded by the IFFT, choosing particular combinations of amplitude and phase for each of the constituent frequency components to represent different data values. After all the data is encoded into the amplitude and phase of each constituent tone, the IFFT is performed to create a time-domain signal which is then transmitted.

For example, it is possible to encode 2 bits of data, representing 4 different possible values (00, 01, 10, 11), on to one tone by simple quadrature modulation, where the amplitude is held constant and four distinct phase values (e.g. +45, +135, +225, +315 degrees, i.e. 90 degrees apart) represent the 4 different combinations. More complex mappings are possible (allowing more bits to be encoded on one tone) using more phase values, or combinations of different amplitudes as well as phases. In practical systems, modulation of one tone can be varied so as to represent as many as 15 or 16 bits in the best case (using 32768 or 65536 distinct combinations of amplitude and phase). Therefore in systems using hundreds of tones, some thousands of bits can be carried in each symbol in good circumstances.

The (forward) FFT is used at the receiver to reverse the process. Once time synchronization with the transmitted waveform has been achieved and equalisation for frequency-dependent phase and amplitude changes (inevitable in the transfer of the signal from transmitter to receiver) has been performed, the FFT is applied to the set of samples making up each received symbol, to reconstruct values of amplitude and phase for each of the tones in use. In general the values obtained by this process are not exactly the same as were initially encoded, for various reasons, including particularly the presence of noise introduced along the transmission path of the signal. Noise is unavoidable in any practical system. However, by applying various techniques to compensate for errors caused by noise, the original data may be recovered with an acceptable level of reliability, provided the system has been configured appropriately, taking into account the signal-transfer characteristics of the transmission path.

In order to ease the work of the receiver in equalizing the received signal for the effects of the transmission route, it is common to insert a short delay between consecutive symbols transmitted. In ADSL, this delay period is called the "cyclic prefix time", in which what is transmitted is a portion of the signal extracted from the end of the immediately following symbol. The name "cyclic prefix" time derives from the fact that the short sequence has been used as a prefix to the new symbol and is cyclically congruent with it. Note that after equalization, the signal received during the cyclic prefix time is ignored by the receiver. In COFDM, the delay period is called the "guard time"; no signal is transmitted during this time.

The IFFT-FFT (encoding-decoding) process provides for great flexibility in the communications system. Different frequencies in the spectrum covered by the set of tones may have different characteristics in respect of noisiness and attenuation over the communication link (e.g. the phone line in the case of an ADSL system). By varying the encoding details tone by tone, this may be accounted for, so as to maximize the number of bits carried by the symbol in total, even when a particular single tone can only carry a small number of bits. U.S. Pat. No. 4,679,227, which describes multi-tone encoding schemes, presents techniques for accomplishing this.

One property of this type of signal encoding is particularly relevant. The waveform resulting from the IFFT can in principle have very large peak values in it—relative to the average amplitude of the signal as a whole—at points where the particular phases of the individual tones happen to sum together in the same direction. For example, if all tones were using encoded simple 2-bit quadrature modulation, and all the data bits being modulated were zero (or more generally if the same pair of bit values were modulating each tone), then at the start of the time domain symbol created by the IFFT there would be a high amplitude "spike", since each component waveform would have a real positive value 0.707 times its peak amplitude, and these would all sum together in the same direction. By contrast, if there is a general haphazard distribution of 1's and 0's in the data, the expected peak value in the average symbol would be much lower, although once in a while peaks will still occur.

On observing the output from a sequence of IFFT operations used to encode a (generalised) data sequence for transmission, the signal is seen to have a sample amplitude distribution which is very like random noise, when considered on a statistical basis. The most frequently occurring sample amplitudes are those near zero (the central point—the distribution is symmetrical either side of zero). Higher amplitudes are less likely, but still occur, and there is a gradual reduction in likelihood of occurrence with increasing amplitude. The very highest sample amplitudes which can occur—unlike with true noise there is a finite limit because we use a discrete IFFT over a finite number of tones—are still many times higher than the average signal amplitude; however, such values occur only extremely infrequently.

The overall statistical properties of the sequence are complex. However, one simple measure of the properties of signals generally is their crest factor. The crest factor of a repetitive signal is defined as the ratio of its peak amplitude to its average (RMS) amplitude. Different types of waveforms can have very different crest factors, depending on their shape. For example a simple pulse waveform, where the signal jumps between just two levels +A and −A, has a crest factor of 1, i.e. the average and peak levels of the signal are the same. A simple continuous sine wave has a crest factor of $\sqrt{2}$ (1.4142135 . . . ). Other wave shapes can be envisaged having widely differing crest factors.

When we are dealing with irregular (non-repeating) signals, such as the output from an IFFT process applied to a random stream of data, the definition of crest factor is adjusted. This is necessary, in order to take into account the statistical spread of amplitude values. In such cases we define the effective crest factor to be the ratio of a threshold level to the average (RMS) level of the signal overall, where the threshold level is that which only some particular small fraction (e.g. $1/10,000,000^{th}$, or $10^{-7}$) of the generated samples will equal or exceed.

With signals created by an IFFT-based modulator, in general, systems in which few tones are used will have a smaller effective crest factor than systems with large numbers of tones. In a typical ADSL system, using 220 tones on the downstream path, the effective crest factor is around 5.3 at the $10^{-7}$ probability threshold.

In practical systems based on the IFFT/FFT pairing, various steps are taken to reduce the impact of its sensitivity to regular patterns of input data. These can readily occur in data sequences delivered to an encoder, especially in the case of ADSL where a fixed padding data pattern must be inserted when no user data is waiting to be transmitted. The problem of such regular patterns in the original data causing high peaks in the output of the IFFT is usually dealt with by performing a reversible "scrambling" operation on the data stream prior to encoding. Two examples of such scrambling mechanisms are self-scramblers and randomisers.

By applying scrambling processes to the input data, any regular patterns in it may be broken up. The distribution of the data bit values going forward into the encoder becomes more haphazard, and so the likelihood of coherence between the phases of the different tones is drastically reduced. This diminishes the frequency with which spikes appear in the time-domain signal, even for a completely regular input stream (e.g. all 1s), relative to that which would apply without scrambling. However, for more irregular input data, no particular change in the statistical properties of the IFFT output will occur.

One major problem with IFFT-based encoding, so far as the design of any practical system is concerned, is that the time domain signal created has characteristics which make it more difficult and/or more expensive to carry through the later stages of the transmission path. For example, the bandwidth of the signal may in some cases be as wide as can theoretically be carried by the discrete sample sequence. Any subsequent processing of the signal, post-IFFT, must therefore be carefully designed to minimise distortions of the signal caused by frequency-dependent variations (e.g. in gain or phase-shift), which are typically worst at the highest frequencies.

However, an issue of great concern is the high crest factor of a typical IFFT-generated signal. This leads to a number of difficulties in designing the circuitry in a modulator & transmitter for an IFFT-based modulation scheme. Some of the problems also occur in the design of a corresponding multi-tone receiving device.

The first problem is that the dynamic range of the digital-to-analogue converter (DAC) must be large, requiring a relatively high number of bits of resolution (typically between 14 and 16 for ADSL). This makes the DAC hard to design, especially since it is running at high sampling rates (in the order of 1-2 MHz or higher for ADSL, and higher still for COFDM). In a receiver for the transmitted signal, the input circuitry must also have a high dynamic range and low noise and distortion; equally its analogue-to-digital converter must have high linearity and resolution.

The second aspect, which is usually considered even more serious, is that it is extremely difficult to design the amplification stages of the transmitter to both yield the high linearity which is needed and also maintain good power efficiency. Because the amplifier (also called the "line-driver" in the case of ADSL) must be able to handle signal peaks several times higher than the average signal level on the line, it becomes necessary to run its power supply at a far higher voltage than the average signal level would require, if the signal's crest factor were lower. Typical power efficiencies for amplifiers in present-day ADSL, system designs are therefore significantly lower than in some other types of transmission system e.g. 15-20% as against 40% or more.

Accordingly, it would be beneficial to reduce the crest factor.

An existing patent which describes a technique for reducing the crest factor is U.S. Pat. No. 5,768,318. In that design, the peak value in each symbol produced by the IFFT is first found, by checking each sample which it contains. If the peak lies below the defined threshold, nothing further need be done and the symbol can be transmitted. Otherwise, when the threshold has been exceeded, a special modification is applied to the input vectors of the IFFT (representing the phase and magnitude of each tone), and the IFFT operation is re-run on the modified vectors. The modification is defined in terms of a scaling and phase rotation for each vector. In the general case described in the prior art, this operation may be applied repeatedly, using different modifications of the vectors each time, selecting whichever first results in a peak below the threshold in the resultant time-domain sample sequence created for the symbol.

The prior art patent also describes a possible implementation in which multiple modifications of the vectors and the IFFT operations on each set of modified vectors are executed in parallel, with a selection being performed between the different resulting time-domain waveforms (each held in a buffer) for one which gives a suitable low peak. This scheme reduces the time penalty implied by repeated sequential vector-modification and IFFT operations, but at the cost of greater hardware size, including more buffers.

Now in order for the decoder at the receiving equipment to know what modification of the vectors (if any) was performed, and hence be able to reverse it so as to decode the original information carried, two things are necessary: (a) the modifications are done in accordance with a fixed set of definitions known by both transmitter and receiver; (b) at least one tone must be reserved in the signal spectrum used to carry the symbol. The data modulated onto the reserved tone(s) is an index value ranging over [0 . . . N] identifying whether any modification was performed, and if so which out of N possible modifications was actually used in the symbol as transmitted. The reserved tone(s) clearly must not be modified themselves, and are not available to carry ordinary data.

The main disadvantages of this scheme are:

(a) It requires both transmitter and receiver to co-operate in order to apply the process. The receiver is required to agree with the transmitter about the reserved tones used to carry the modification index. Then, on reception of every symbol, the receiver must first identify the index of the modification applied (by decoding the reserved tones), and if appropriate perform the reverse processing on the output of its FFT operation, before it can continue with the decoding process. This will take extra computation capability, and time, at the receiver.

(b) It consumes data bandwidth for the reserved tone(s) to carry the modification index information; this reduces the bandwidth left for user data.

(c) The carriage of the modification index value must be especially reliable—if the index is decoded incorrectly, the whole symbol cannot be decoded. To provide the additional reliability, either extra bits for forward error correction (such as a CRC), must be sent along with the index value itself, or else the degree of noise margin required when modulating the reserved tone(s) must be set much higher than normal for the main data-carrying tones, or some other method of protection must be applied to that information. Whatever scheme is used will inevitably take more data bandwidth than the same number of bits would need in the main body of user data, so the available user data bandwidth is further reduced.

(d) In the context of standards-conformant ADSL systems, the technique is incompatible with existing standards. Only if the two modems involved both support the technique in the same way can it be used. To do so they must use standards-compatible methods to identify each other's capability in this regard, early in the negotiation phase of initialising the link, before the tones have been allocated to data. Then some proprietary method must be used to set up and activate the extra processing involved at each end of the link. There is no possibility of using this technique when only one of the modems supports it, or if they use differing proprietary methods to implement it. Hence its application is limited.

(e) In many systems using multi-tone modulation, especially by way of example (but not limited to) ADSL modems, it is now very common to use certain pre-processing techniques, including oversampling and signal filtering, in that part of the transmitter circuitry which leads up to the DAC (Digital-to-Analogue-Converter) and thence to the line driver, within what is usually termed the analogue front end (AFE).

Oversampling is a well-known scheme where the sample rate of a (usually digital) sample stream is deliberately increased, typically by an integer factor (say ×2 or ×4), relative to the basic sample rate of the input signal (in our case, the succession of samples forming the symbol as created by the IFFT), for ease of performing certain types of processing on it. The use of oversampling and/or signal filtering presents a problem for the concept of symbol re-generation. Symbol re-generation is applied when peaks in the time-domain representation of a symbol exceed a pre-defined threshold. But the up-sampling process which creates the oversampled stream will itself inevitably cause changes to the symbol shape as viewed in the time domain. This happens because any signal filtering applied, and/or the filter required in any up-sampler (over-sampling block), are bound to cause at least some changes in the relative phase and amplitude of the individual tones of the symbol. Even quite small effects of this sort can have a significant effect on the time-domain shape of the symbol. In particular, the result may be to radically change the location and—most critically—the value of the peak sample in a given symbol (compared to the original shape created by the IFFT), yielding higher peaks in some cases and lower ones in others. The signal filtering operations which may be carried out in relation to multi-tone transmission include band-pass filtering (typically required in COFDM transmission systems) and high-pass filtering (commonly needed for ADSL transmitters).

Such changes are benign, so far as the receiving modem is concerned (much larger effects are normally caused later in the communication path, especially in some types of analogue component, so the receiving modem must compensate for these effects in any case). But, in a modulator which uses oversampling, checking for the peak value in a symbol immediately at the output of the IFFT stage may well give rise to false results. A symbol which does not appear to contain a peak above the threshold at the IFFT output may turn out to have a higher peak after oversampling; alternatively a symbol with a high peak post-IFFT may actually have a reduced peak value as a result of oversampling. Thus, the choice of whether or not to attempt to re-generate the symbol would be erroneous in both cases. In the first case no re-generation would occur, yet the symbol presented to the line driver could have a peak above the threshold, causing the actual transmitted crest factor to be higher than intended, and possibly giving rise to unwanted effects such as distortion of the transmitted signal, because the line driver could be over-driven by the signal. In the second case, the effort spent to re-generate the symbol would have been wasted, since the original symbol, as it would have been seen at the line driver input, would not have contained a significant peak anyway.

Accordingly, there remains a need for an improved method of crest factor reduction and improved apparatus implementing the improved method.

SUMMARY OF INVENTION

According to the invention there is provided a modulation method for multiple-tone signalling for use in a device having a modulator and an analogue front end, the method including the steps of: processing input data through a plurality of intermediate processing stages and corresponding stages of intermediate data to generate preprocessed data; inverse Fourier transforming the preprocessed data to obtain a symbol including a number of tones; buffering the symbol; modelling the peak amplitude that the symbol will have after the subsequent processing in the analogue front end and comparing the modelled peak amplitude with a threshold; if the modelled peak amplitude in the symbol exceeds the threshold, amending predetermined intermediate data such that the input data is still represented by the intermediate data, carrying out the subsequent intermediate processing stages on the regenerated data to regenerate preprocessed data and inverse Fourier transforming the regenerated preprocessed data to obtain a regenerated symbol including a number of tones; and replacing the buffered symbol with the regenerated symbol; and outputting the buffered symbol through the analogue front end.

It will be appreciated that the method of the invention will generally be applied to a stream of incoming data to output a stream of symbols. Normally, only a small proportion of the symbols will need to be regenerated.

One idea underlying the invention to be described here is that, when there is a peak above the threshold in the time-domain symbol created for transmission, re-processing to create a new and different time-domain version of the symbol is performed, not directly on the input vectors of the IFFT, but starting further back in the sequence of operations which lead to the generation of the IFFT input vectors. Furthermore, instead of performing some special reversible modification of the intermediate values representing the symbol (such as the phase and magnitude information of the IFFT input vectors), leaving the data carried unmodified, and having to send additional information to the receiver to indicate when this has been done, it is possible to change certain data bits being carried within the symbol as transmitted, but in such a way as to be of no consequence for the receiver, and not to affect the reliability of transmission of the user data.

One way to determine accurately whether a given symbol will contain a peak above the threshold level would be to simply measure the peak after the preprocessing normally carried out in the AFE has been performed. Up-sampling, and any signal filtering required, might occur immediately after the IFFT and cyclic prefix insertion, before the peak of the symbol is measured. But the problems with this are two-fold, arising from the fact that the up-sampling increases the size of the data representing the symbol.

The first problem is that it would be necessary to buffer the symbol before allowing it proceed to the remaining stages of the AFE, in case it must be re-generated. If the buffered symbol is at this point already oversampled (by a factor of 2, 4 or even 8), the buffering requirement will be increased by the same factor, which is clearly undesirable.

Secondly, it is a common arrangement in ADSL modem design that the AFE module is physically a separate device. In this case, with oversampled symbol data at the buffering point, the rate of transfer of data from the device containing the modulator to the AFE module would need to be also increased by the same amount. Such an increase is undesirable since it will typically cause more power to be consumed, increase local electrical noise, and generally make system design harder.

The solution of the invention avoids these problems. It involves a functional block which models the pre-processing performed within the AFE module, for the purpose of allowing the peak value in each symbol after pre-processing to be measured; the block is connected to the output of the modulator module (immediately after the IFFT and cyclic prefix insertion blocks) as is the symbol buffer. Actual pre-processing is still performed by the AFE module as before.

In this way, symbol regeneration to reduce the crest factor can be performed even in the presence of signal filtering or oversampling functions or other signal processing elements in the analogue front end that affect the transmission of symbols from the IFFT module to the line driver.

The invention relates to apparatus for carrying out this method as well as to a computer program product for implementing the method.

Using the invention it is not necessary to introduce extra complexity by defining new, relatively expensive special operations on the IFFT input vectors, as the prior art does, in order to achieve the goal. Nor is it necessary to pass a separate indication along with the main data in the symbol, to allow the receiver to reverse the process and recover the user data. Instead all that is happens is that a small modification is made to some intermediate data item in the set of data items which were encoded to create the symbol, followed by a repeat of the normal data processing for transmission, using exactly the same steps as were performed the first time the symbol was encoded (and which any transmitting modulator would perform). Thus the receiver can be left completely unaware that the transmitting modem is implementing this scheme; it has nothing different to do. The same amount of user data can be transmitted, in exactly the same way as before, and no extra information has to be transmitted. Thus, all the disadvantages inherent in the prior art arrangement are avoided.

A discovery underlying this invention is that significant perturbations in the values of the input vectors for the IFFT, sufficient to cause the modified symbol to take a shape substantially different from the original one, can be accomplished by quite small and simple changes to the data being processed within the encoding system prior to the IFFT input stage. When a symbol is detected whose final (time-domain) signal shape contains a peak higher than the threshold level, all or part of the processing of data which was performed in order to create that symbol is re-executed, this time making a change to some item of data which contributes to the symbol. If the resulting re-generated symbol has a lower peak value than the threshold, all is well and the revised symbol is sent. Depending on circumstances, (e.g. as determined by the availability of required resources such as processing cycles and buffer memory) if the peak value of the new symbol is still no lower than it was, or still above the threshold, further attempts at re-generation may be made, using other changes in the data.

The one known disadvantage of this new scheme relative to the prior art, is that a little more computational cost is incurred, in that when it is desired to re-generate a symbol, some of the earlier processing prior to the IFFT has to be re-run, as well as the IFFT operation itself; however in compensation no separate processing of the IFFT input vectors is required. Such re-processing may also require some additional memory in order to buffer data in the modem for a longer period than it would otherwise be needed for. However, the overall cost of this will typically be small, especially for a system in which the repeated processing is performed in software rather than by fixed hardware functional blocks (though a hardware-based system could also be designed to implement this invention), and even more so when a single device is implementing the modulation processing for multiple channels of ADSL transmission at the same time; then the small extra resources required can be shared between all instances of the modulator function—the frequency with which they are needed will typically be low enough that only one channel is likely to need them at any one time.

By way of illustration, if it is desired to reduce the crest factor of a transmitted ADSL signal from 5.3 to 4.3, and assuming that any symbol may be freely regenerated, on average only one symbol in 130 will need to be re-generated for any given line; for a target crest factor of 4.0, the average regeneration rate is approximately one in 25 symbols.

Preferably, the subsequent intermediate preprocessing stages used to regenerate preprocessed data include a scrambling stage. A scrambling stage is efficient at causing significant changes in the final symbol for only small changes in the intermediate data.

In embodiments, the data includes a series of ATM frames including a plurality of ATM cells and in at least some frames further including fast bytes and/or sync bytes and the step of amending the predetermined intermediate data includes amending the fast or sync bytes of the ATM data stream.

BRIEF DESCRIPTION OF THE DRAWINGS

Embodiments of the invention will now be described, purely by way of example, with reference to the accompanying drawings, in which.

SPECIFIC DESCRIPTION

Figure 1:
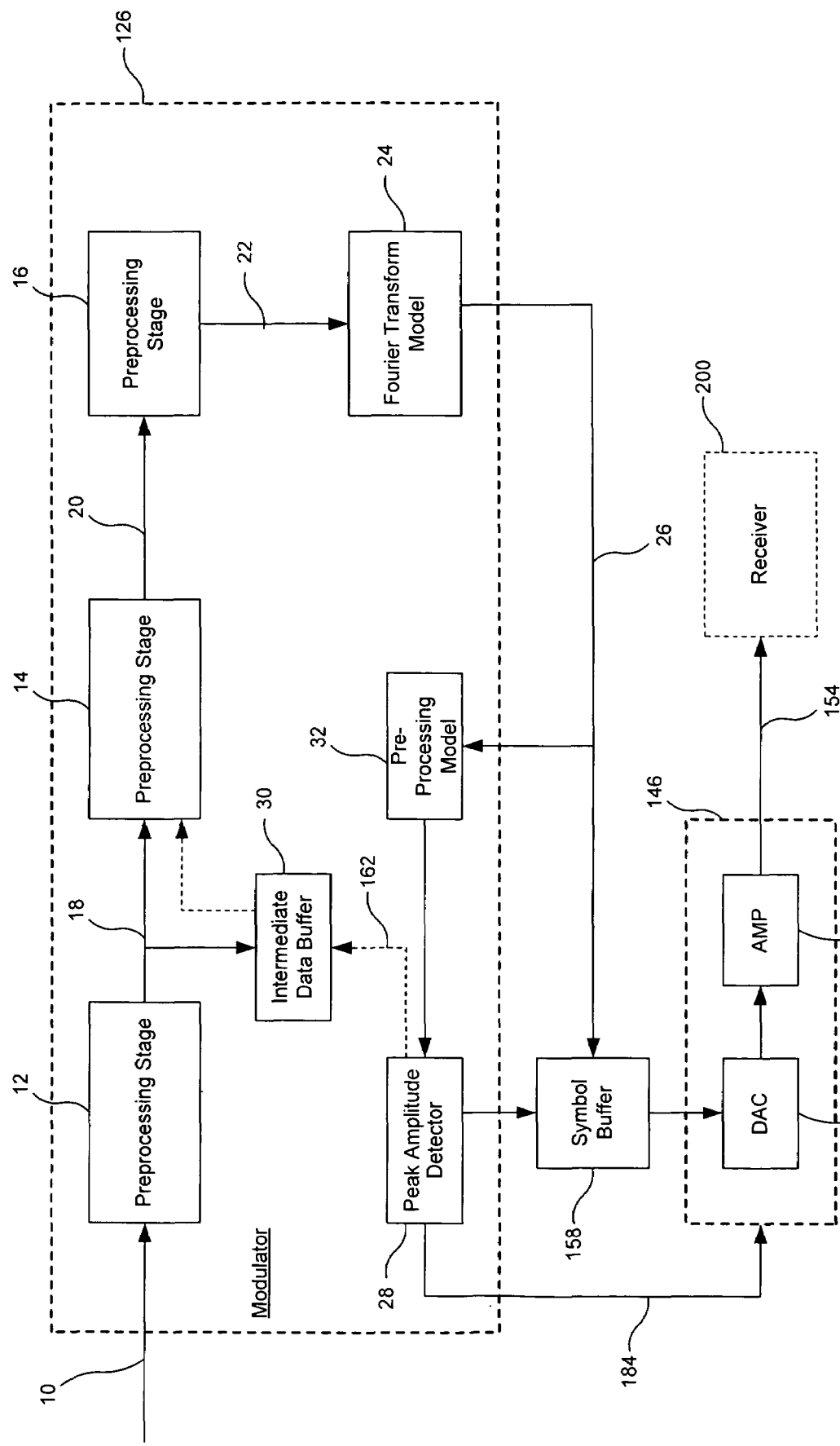
FIG. 1 shows a block diagram of a first embodiment of the invention.

FIG. 1 shows a schematic diagram of a first embodiment of an apparatus according to the invention.

An input data stream 10 is input through a plurality of preprocessing stages 12, 14, 16. Each preprocessing stage produces intermediate data 18, 20, 22. The intermediate data 22 produced by the final preprocessing stage 16 will be referred to as the preprocessed data 22.

The skilled person will be aware of many suitable intermediate preprocessing stages that can be used or not used as required. For example, the input data may need to be divided into cells or frames. Buffering may be required. Blank data can be added if insufficient cells are frames are input. One of the stages may carry out scrambling, so that if the input data is regular the output of the scrambling stage is not regular to avoid peaks in the output. Error protection (forward error correction), such as Reed-Solomon, and other suitable steps may be used.

Further intermediate preprocessing stages may be used to generate the multi-tone symbols. One stage may assign the data to tones, another may carry out constellation encoding and a further stage may carry out gain scaling. The skilled person will be able to select suitable stages for the required application.

The preprocessed data 22 is fed into the Fourier transform module 24 that carries out an inverse discrete Fourier transform to generate a stream of symbols 26.

The symbols are then passed to both a symbol buffer 158 and also passed to an AFE preprocessing model 32. The symbols are output through analogue front end AFE 146. Although the symbol buffer 158 is shown as being separate from the modulator 126, in embodiments the buffer is incorporated in the modulator. The term analogue front end, as used in the present specification, is not necessarily intended to refer to a purely analogue device. Indeed, the preprocessing is often carried out in the digital domain. The term 'analogue front end' does however include the digital-to-analogue converter (DAC) and associated circuitry which supplies the analogue output signal, typically via an amplifier (line-driver), to the communication path carrying the final transmitted signal.

The AFE preprocessing model models the effects of any filters, oversampling and other components in the AFE on the symbols. The peak amplitude in the symbols including the modelled effect of the AFE is then determined in a peak amplitude detector 28. This detection is preferably carried out in the digital domain.

If the peak amplitude in a given symbol exceeds a predetermined threshold, then control signals 162 indicated as dashed lines are output to cause the symbol to be regenerated. Intermediate data 18 input into one of the intermediate stages is amended, or regenerated, in such a way that the regenerated data still corresponds to the original input data, by changing one or more bits in the intermediate data. The regenerated intermediate data is then processed through subsequent intermediate stages 14, 16, and the Fourier transform module 24 to produce a regenerated symbol.

Conveniently, a buffer 30 may be provided in one or more of the intermediate stages to retain the intermediate data 18 in case it is required to regenerate the data.

There are a number of possibilities as to what occurs with the regenerated symbol. The simplest option is simply to replace the symbol in the symbol buffer 158 with the regenerated symbol. Since the original symbol in the symbol buffer exceeds the peak threshold, replacing the symbol is likely to reduce the peak amplitude and hence improve the crest factor, assuming the threshold for regeneration is correctly set.

In an alternative arrangement, the regenerated symbol may be stored in the symbol buffer 158 as well as the original symbol. Then, the peak values of the original and regenerated symbol are compared, and the original symbol replaced if the regenerated symbol has a lower peak value. The replacement may take place in any convenient fashion, including for example copying the regenerated symbol over the original symbol or simply swapping the functions of the two stored symbols.

If the peak amplitude remains too high a further regeneration attempt, or attempts, may be made. The best symbol, with the lowest peak amplitude, may finally be sent. In embodiments, up to a predetermined maximum number of attempts may be made. The number may be in the range three to ten inclusive, for example six.

Although the diagram shows a plurality of separate stages, some or all of the stages may be implemented using a multi-purpose data processing apparatus programmed to carry out the same method.

By modelling the subsequent processing in the analogue front end 146 in model 2, it is possible to determine when a symbol needs to be regenerated even in the presence of processing in the analogue front end 146. Thus, the crest factor of the data stream output from the analogue front end may be reduced.

The invention uses the discovery that some of the stages of processing performed on the stream of data passing through the modulator in a multi-tone modem (from its data input towards the physical line transmitter) have a general tendency to "spread" the original data values over a wider distance in the later stages of the stream than they occupy in the input. (This is true for both ADSL and other types of modulation system using multi-tone signalling.) By this is meant that a change in a single bit or group of bits in the input can cause a larger number of bits to be changed in the subsequent output stream from some data processing steps. Thus the scale of change in the data processing, required to cause a large perturbation in the input vectors of the IFFT (i.e. one large enough to mean that the re-generated symbol is effectively a new and independent shape) can be kept very low, potentially as low as a single bit changing.

In the embodiment described, the preprocessing stage 14 following the introduction of regenerated intermediate data 18 is a scrambling stage. Scrambling has a particularly strong effect: any single bit change (0 to 1 or 1 to 0) in the payload of the ATM cell stream will have a permanent effect on the subsequent output from the payload scrambler (after an initial period while data bits percolate through its internal memory), since that process has local feedback and retains a memory of the effect of all bits which have passed through. A second scrambling stage, applied to the full data stream (including ATM cell headers and other overhead data), similarly causes all later data output values (beyond an initial short sequence) to be affected as a result of changing a single input bit.

It is however not necessary that the subsequent stage is a scrambling stage. The scrambling can be carried out later or not at all.

Moreover, other operations such as the addition of Reed-Solomon error protection bytes, and the application of trellis encoding, have a weaker effect, but one which is still very helpful for present purposes. For Reed-Solomon (R-S) protection, changing any one bit in a block of data bytes which is protected by R-S parity bytes will generally cause many bits of those parity bytes to change (but will have no other effect on the rest of the data block). The spreading effect with trellis encoding is most pronounced for tones which have few bits allocated. Since in common usage of ADSL, many tones do indeed have few bits (e.g. 2, 3 or 4 bits per tone), this is still a significant effect.

The present invention may be applied to ADSL modems. Use is made of this "spreading" effect of the various data processing stages, so as to cause a large change in the output of the final processing step before the IFFT is performed, thereby yielding a different shape and hence a different and probably lower peak value of the time-domain symbol. To do so it is required to introduce only a small change to the data passing through an early step of the processing sequence. Furthermore as will be shown, such changes can be made without impacting correct transmission of the incoming data stream through the communication path of which the ADSL modem forms one part.

Alternatively, the invention may be applied to alternative multi-tone signalling systems, such as COFDM (Carrierless Orthogonal Frequency Division Multiplex), a standard widely adopted for digital terrestrial TV broadcasting.

Figure 2:
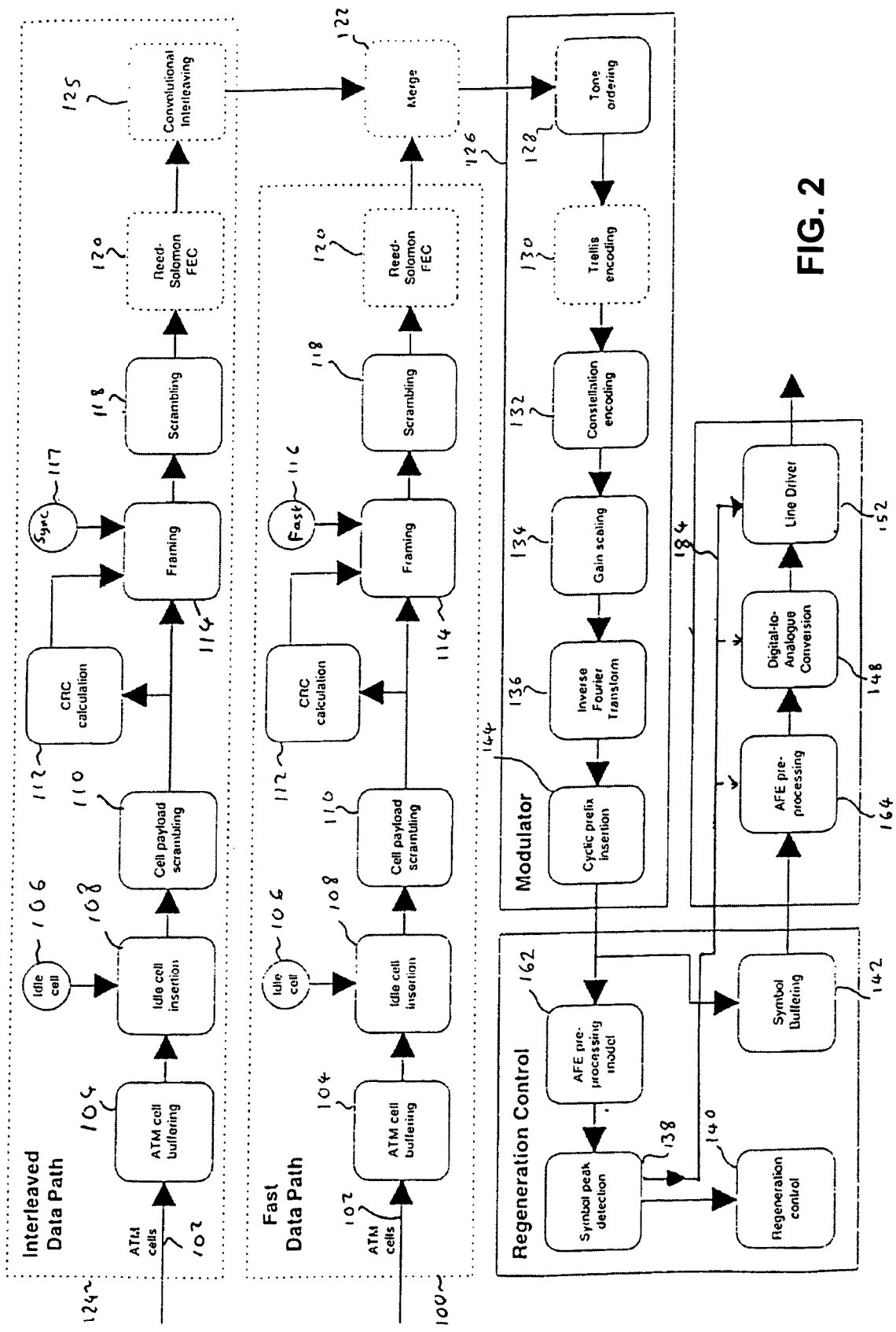
FIG. 2 shows a block flow diagram of a second embodiment of the invention.

A second embodiment will now be described, specifically with reference to an ADSL flow diagram. FIG. 2 shows a flow diagram of an ADSL modem that transmits ATM cells 102. In a fast data path 100, the cells are buffered 104, and idle cells 106 are inserted 108 as required. The cell payload is then scrambled 110, and a cyclic redundancy check 112 performed. Data bytes from the ATM cell stream are then grouped together by framing 114, adding fast bytes 116 where required. Scrambling 118 then takes place, followed optionally by Reed-Solomon forward error correction 120.

Another, interleaved data path 124 is also shown, having the same steps except that sync bytes 117 are used instead of fast bytes 116, and there is additionally a final step of convolutional interleaving 125.

The cells of the two data paths 100, 124 can then be merged 122. As will be appreciated, it is not essential for there to be any particular number of data paths and the merging step 122 is only required where there are a plurality of paths.

The framed, scrambled and merged data stream is then passed to the modulator 126 which carries out the steps of tone ordering 128, optional trellis encoding 130, constellation encoding 132, gain scaling 134, and finally inverse Fourier transform 136 to produce a stream of symbols each encoding some portion of the ATM cell stream, ranging from one or two partial ATM cells up to several whole and some partial ATM cells. Until this point, all of the operations are conventional and well known to those skilled in the art.

Until this point, all of the operations are conventional and well known to those skilled in the art.

Cyclic prefixes are then inserted (step 144). The symbols including prefixes are then passed to a symbol buffer 158 for buffering 142, and also to a modelling step 162, to be described below. In many prior art arrangements, cyclic prefix insertion 144 is carried out after symbol buffering 142, but including cyclic prefix insertion at an earlier stage avoids the need to include the insertion of cyclic prefixes into the model of the analogue front end.

The output from the symbol buffer is passed to the analogue front end 146. This carries out preprocessing 164. In embodiments, the preprocessing includes signal filtering (optional) and oversampling; in oversampling the sample rate of the incoming stream is increased, typically by a factor of 2, 4 or 8 relative to the sample rate emerging from the buffer 158. Normally, the oversampling function includes a low-pass filter; it and any signal filtering functions inevitably cause some changes in the relative phase and amplitude of the individual tones of the symbol.

The oversampling eases the subsequent signal processing, in particular the digital to analogue conversion 148 which is the next step. Finally, the analogue signal is used to drive the line (step 152).

The AFE preprocessing step 162 models the effect on the symbol of the AFE preprocessing, including the oversampling and any filtering. Since the AFE preprocessing is generally carried out in the digital domain, the skilled person will not have any difficulty in modelling the preprocessing.

Most straightforwardly, the AFE preprocessing model will simply be a copy of the real AFE preprocessing functions in the digital domain used in the AFE proper.

For example, as long as there is sufficient processor power in the modulator 126, the same processing can simply be carried out on the symbol as will later be carried out in the AFE. Preprocessing will accordingly not be described further.

The peak value of the symbol can then be detected (step 138). If the peak is above a predetermined value then regeneration of the symbol is performed, under regeneration control 140. The ways in which this is done will be described in more detail later.

Thus, in a modulator according to the invention, symbols can be regenerated only when the final signal input to the line driver would otherwise have a peak amplitude at a particular time greater than desired.

Further, by modelling the preprocessing separately from the AFE, it is possible to reduce the amount of symbol buffering to below that which would otherwise be required, since to provide the buffering after the AFE preprocessing 164 would normally require more space for the oversampled (and therefore expanded) sample data making up the symbols.

Furthermore, the AFE module can be a separate module, as presently common. The AFE module does not have to carry out some of the processing for symbol regeneration.

If instead of using the approach of the invention the preprocessing were to be carried out in the modulator, oversampled data would have to be transferred from the modulator to the DAC in the AFE. An increase in data transfer rate over the already high rate would typically require more power to be transferred, increase local electrical noise, and. generally make achieving system design goals more difficult.

Note that each step shown in the FIG. 2 within the Data Path modules, the Modulator module and the Regenerator Control module, could in principle be implemented either by hardware or by software, or by some combination of the two. The AFE module steps normally use hardware blocks for its functions.

The preprocessing step 162 may be implemented in various ways: (a) as a fixed hardware block, matched in function to the preprocessing block in the AFE; (b) as a programmable hardware block (for example, having variable coefficients in its filters, and/or switchable processing elements) or (c) purely as a software program to be run on the central processor of the modulator. In the latter two cases, the preprocessing model used can be varied through software so as to adapt it for use with different analogue front ends.

Figure 3:
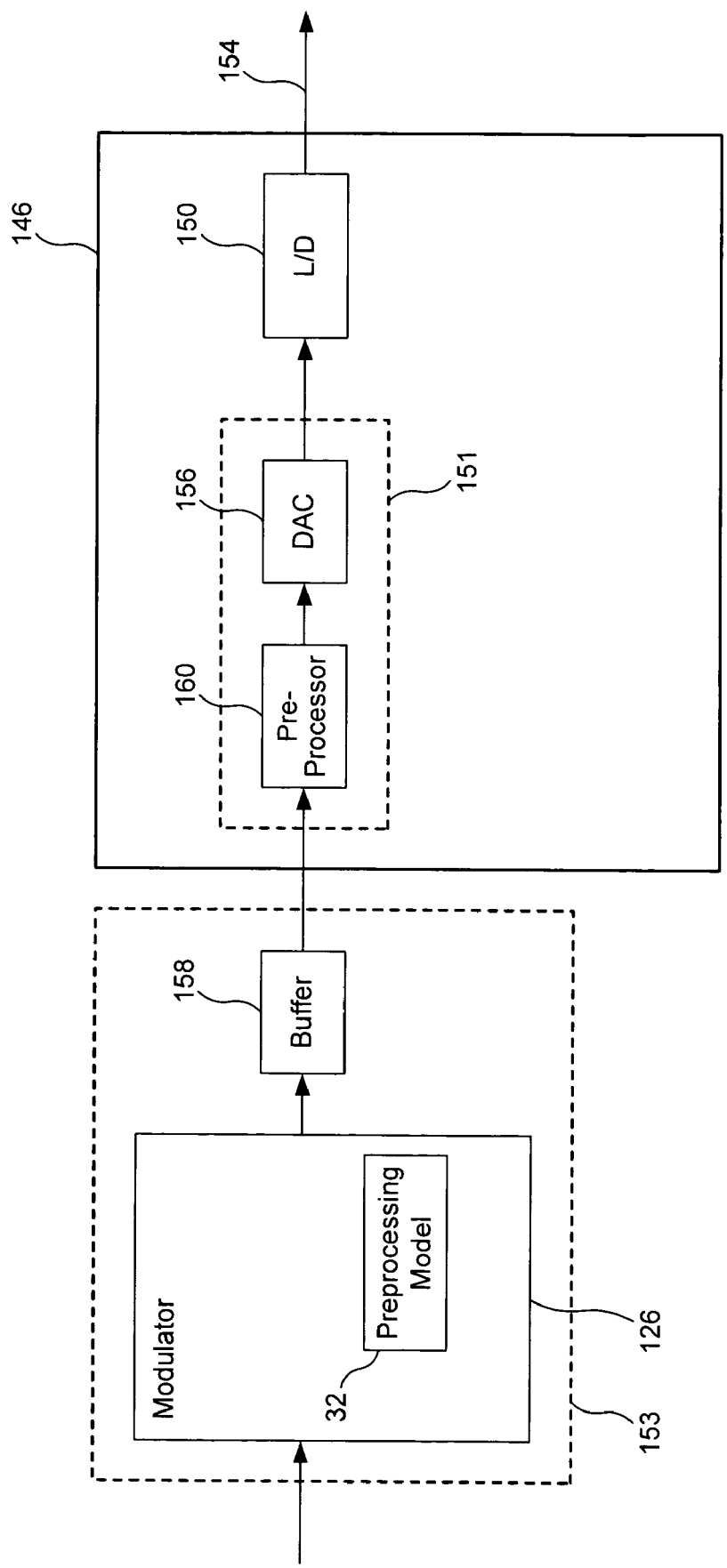
FIG. 3 shows a block diagram of a transmitter implementing the second embodiment.

A specific embodiment of an implementation is illustrated in FIG. 3. A modulator 126 feeds data through a buffer 158 into the analogue front end 146 which contains a preprocessing block 160, a DAC 156 and a line driver 150 to drive the phone line 154. These features are conventional.

To implement the invention in an ADSL modem, certain features are required in the device. For a number of known modem designs, some of these features are already present, so use of the invention may require changes of only quite modest scope, compared with an existing design.

The buffer 158 between the output of the IFFT processing stage and subsequent stages is of sufficient size to hold at least all the samples representing one full time-domain symbol, plus additional sample buffering to cover the transfer of data from earlier output symbols while symbol-regeneration is attempted. The buffering is used because when a symbol is found after IFFT to contain a peak which it is desired to remove, the symbol must not be allowed to proceed further, into the final output stages of the modem, but must be held pending an attempt or attempts to re-generate it. If re-generation is successful, the new symbol created must replace the original one in the buffer before the latter is ready to be transmitted down the line; failing that, the original symbol may be sent.

Some additional buffering may also be required earlier in the data processing parts of the modem, in order to support the re-processing capability. Specifically, any data which would normally discarded once the data for a particular symbol had been processed through a stage, must instead be retained in case re-processing of that symbol is required. However, this additional memory is only needed until the check is made as to whether the time domain symbol contains a peak above the threshold, prompting a re-generation attempt. The memory may be re-used as soon as a symbol's peak value is found to be below the threshold, implying that no re-generation is needed.

Preferably there is a reserve of processing capacity, over and above the amount required to perform normal modem processing for transmission. This is because when symbol re-generation occurs, additional processing time will be spent on this, which must be made up for, over time. Normal per-symbol processing should therefore take at least somewhat less than the real time for a symbol to be transmitted. For example, if it is expected that one in every 1000 symbols will need to be re-processed for purposes of peak reduction, then the individual per-symbol transmit processing cost needs to be less than $1-\frac{1}{1000}=99.9\%$ of the available processing resource. Clearly this is not in general a difficult constraint to meet(!). However, to allow for irregular timing of re-generation events (such that while the average rate is 1 every 1000 symbols, sometimes two high-peak symbols may occur in close succession), requires a further margin of processing performance: e.g. if there is a 5% reserve (processing is done in only 95% of available time) then two difficult symbols only 20 symbol times apart can be handled. In general, statistical analysis based on the exact peak-reduction factor which is aimed at will allow a characterisation of the actual performance margin needed in a particular system design. Note that it is perfectly acceptable to have a rule which prevents overloading of the processor by refusing to attempt regeneration of a symbol if insufficient time has elapsed since the last re-generation event occurred (i.e. the processing has not "caught up" enough at the time from the earlier events). All that happens is that that particular symbol will be transmitted unmodified, having a peak above the threshold, but the overall (long term) crest factor will still be lower, because such situations will statistically be very rare relative to the frequency of effective symbol re-generation.

In the embodiment, the preprocessing and DAC units of the AFE 146 are implemented in one chip 151 and the modulator 126 including the model 32 and buffer 158 in another chip 153; the line-driver 150 is a third separate device.

The digital modulator 126 is built on a small geometry, more expensive process, so as to keep its size down and maximise digital processing speed. The preprocessing and DAC units of the AFE 146 are built on a larger-geometry, but cheaper and slower silicon process, which makes the design of analogue elements easier, and reduces the chip's cost.

The modelling step 162 in the modulator, in this example, is chosen to be another instance of the preprocessing unit 160 in the AFE 146. However, because of the smaller geometry, it takes up less space. Since it is on the faster modulator chip 126, it can be clocked much faster.

Further, practical implementations of the invention may include multiple output channels. Since digital logic (including the preprocessing unit 160) in the AFE 146 is generally clocked more slowly than the modulator 126, and for other reasons, one physical copy of the preprocessing circuitry 160 is then used in the AFE for each output channel supported, rather than multiplexing the circuitry across different channels. However, in the modulator 126, the faster clock speed allows the modelling circuitry 32 to be time division multiplexed across multiple channels, thereby saving space. Thus, the overhead associated with the duplication of the preprocessing circuitry 160 as the modelling unit 32 may be less than would at first be thought.

The actions carried out to regenerate symbols which exceed the predetermined peak value will now be described in much more detail. Various methods of changing the data values in the ADSL stream are identified, which can be applied in manner fully compatible with the various national and international standards for ADSL systems (e.g. ITU G.992.1). Note that these methods are not mutually exclusive, but can be applied in various combinations to allow multiple attempts (either sequentially or in parallel) when re-generating a symbol.

Fast Byte/Sync Byte "X" Bits

The single most valuable point at which data changes can readily be performed is in the "fast" and/or "sync" bytes which are defined to occur in ADSL data symbols. The fast and sync bytes are overhead bytes, not themselves part of the stream of data (usually an ATM cell stream) to be carried over the link, but associated with it, and physically carried as a part of the modulated signal. Depending on configuration, in many (though not all) ADSL data symbols, they contain control information used to manage the synchronization of data streams being transported over the ADSL link which were originated via a communication path whose control clock is asynchronous to the ADSL modem's own control clock. However in many practical systems using ADSL modems, this capability is not required. Even where it is needed, it may actually be applied only rarely, leaving the byte available for application of the technique described here, most of the time.

When a fast or sync byte is not carrying synchronization control values, it is defined to carry values of a fixed pattern, of the form XX0011X0 for the fast byte and XX0011XX for the sync byte. The bits shown as X can be freely set to either 0 or 1 as desired. With three or four bits whose value may be changed at will, there are a total of 8 or 16 possible combinations of 1s and 0s which may be created; therefore up to 7 or 15 attempts to re-generate a symbol are possible. This is more than adequate, in general.

Depending on configuration, fast bytes occur at the start of many (e.g. 64 out of every 68) data frames of ADSL when "fast" (low latency) data streams are used. Changes in any X bit of the fast byte will cause much larger scale changes in the symbol because the stream scrambler is applied to this byte first in the fast data stream, so the scrambled form of almost all subsequent data bytes in the fast stream (but not the interleaved stream if also present) will in general be altered. Reed-Solomon encoding (if applied) also follows the scrambler so the added R-S parity bytes will in general take different values. Finally, the trellis encoder (if applied) will also cause changes to the output stream, because of any change in its input, over a given frame. Furthermore, since the fast byte is the first byte in each whole data frame (including also the interleaved data if present), this means that the trellis encoding of all or almost all tones in the symbol is liable to be modified by a single bit change in the fast byte.

Sync bytes occur within most frames when interleaved streams are used. As with the fast byte, changes in any X bit of the normal sync byte pattern will affect all subsequent bytes in the interleaved portion of the data frame, through the application of the stream scrambler to the interleaved stream. However if the convolutional interleaver is applied, then older data from the interleaver's buffer, which will also appear in the final encoded symbol, will not be affected by the change; thus changes to the sync bytes are less effective. However, if trellis encoding is in use, then all output data of the trellis encoder, starting from the interleaved part of the frame, will still be affected by a change in the sync byte.

Both fast and sync bytes occur in many frames in a "dual latency" system where both fast and interleaved streams are active. In this case, either or both fast and sync bytes may be changed (a total of up to 7 X bits) to effect a significant change in the final time domain form of the encoded symbol.

The principal limitation of this method is that in some cases, the fast or sync bytes are not available—4 data frames (symbols) out of the 68 data frames in each ADSL "superframe" structure are defined not to carry them (the byte location in the frame is used for a different purpose in these frames), and in systems where synchronization must be performed, these bytes may occasionally carry values other than the default pattern with its three X bits. In most configurations, the fast and sync byte locations in the ADSL data frame are shared with use for other purposes, though these will generally be infrequently used; additionally one configuration reduces the number of frames carrying fast and/or sync bytes to 32 (rather than 64) out of every 68. If it is desired to modify the data and regenerate the symbol in these cases also, some other method must be found; alternative methods are given below.

Idle Cell Payload Modification

Of all possible techniques for changing data in an ADSL modem in order to cause symbol re-generation, changing data in the payload bytes of an ATM cell, as seen at the input end of the transmitter-side processing, has the greatest possible "spreading" effect. This is because the largest number of steps, each of which causes spreading, will subsequently be applied to the data: (a) the payload bytes in the cell are scrambled; (b) the composite stream is then scrambled again; (c) Reed-Solomon error protection may optionally be applied to the stream; and (d) trellis encoding may optionally be applied to the stream while creating the IFFT input vectors. Even if no R-S encoding or trellis encoding is used, the two sequential scrambling processes are enough to cause a huge spreading effect on the data. Therefore, if even one bit of a cell's payload is changed, the regenerated data at later stages of the ADSL processing sequence will in general be very different, resulting in an equally significant change in the time-domain signal created, and hence (by probability) a high likelihood of creating a new symbol with a lower peak value than the original one.

However, in general, it is not desirable to change the user data—the purpose of the modem is faithfully to transmit exactly that data with which it was supplied, over the link to the other end of the ADSL connection. Therefore it is strongly preferred, not to modify that data. However, idle cells can provide a way to achieve the effect of the invention, without damage to real user data.

Idle cells are ATM cells of a special reserved type, which are used to pad out a data stream. Idle cells are defined by a particular fixed pattern in the cell header—this is how they are recognized as idle cells when received. The payload of an idle cell is also defined as a fixed pattern, the same in every byte. In ADSL, the transmitting section of each modem is obliged to insert idle cells into the data stream whenever no user data cells are available to be transported. This is required because the physical data rate of a standard ADSL link is fixed at initialisation, and is maintained until the line is shut down or re-initialised. Since it is not possible to send "no data" when no user data is present, idle cells are sent instead, to maintain the flow. At the receiving end, idle cells are simply discarded—their contents are not related to real user data carried by the connection.

This observation provides another method of changing the data stream, for symbols where it is desired to re-generate because of a peak above the specified threshold in the encoded time-domain version of the symbol. What can be done is to check whether any byte of data carried by the symbol is part of the payload of an idle cell, and if so, to make a modification in that byte. Because the payload of idle cells is ignored by the receiver 200, any bit of the 8 in the byte can be modified, allowing up to 255 possible modifications (relative to the original value) to be tried out—this is far more than enough! In general, to achieve maximum effect, the earliest available idle-cell payload byte in the data for the symbol should be so modified, since all modifications affect (by spreading) only the encoded form of later bytes in the stream (and hence, that portion of the stream which is carried in the rest of the symbol).

Most installed ADSL connections only carry user data for a small proportion of the time, when considered on a long term basis; so idle cells will be very common in general. Since an idle cell does not contain any user data, its payload is not of interest, being fixed. Changing any bit in the payload of an idle cell will have no effect on the user data also carried by an ADSL connection.

This method is therefore applicable in many cases. Only when the line is fully occupied with user data at the time, such that no byte in the data carried in the particular symbol to be regenerated is part of an idle cell's payload, will this technique not work. But since on a long term statistical basis, most bytes of data carried over ADSL lines will be idle cell payload bytes, this method will frequently be available.

One proviso to this method is that one way of checking the error rate on an ADSL link, sometimes employed for purposes of link maintenance and management, is for the receiving modem 200 to examine the payload bytes of idle cells before it discards them, comparing each byte against the fixed value it is defined to hold in any idle cell. Any errors found in the comparison are assumed to have arisen as a result of uncorrected errors in transmission of the data stream over the ADSL link. Some modems keep count of the error rate on this basis (measured as a moving average of the number of bits in idle cells which are found to be incorrect, divided by the total number of bits in the idle cells seen, over some measurement interval). In such cases, the deliberate introduction of changes to idle cell payload bytes will give rise to an incorrect assessment of the true error rate by the receiving modem 200. In the worst case this may trigger an attempt to re-configure or re-initiate the link, so as to maintain the apparent error rate below the required maximum level.

Clearly it is useful to guard against such behaviour. One possible method is to define a limited set of modifications to idle cell payload bytes which can be attempted by the transmitting modem. Instead of the standard fixed payload byte value, a small number of alternative values (say, 3 out of the 255 remaining possibilities, or even just one value) could also be considered to be "legitimate" in idle cell payloads. In such a: scheme, the receiving modem would be modified so as not to count such values in idle cell payloads as being errors, for purposes of error rate calculation. This modification still allows a high rate of true error detection, since the probability that a randomly corrupted idle cell payload byte takes one of 4 specific allowed values out of the 256 possible ones is only $1/64$, or $1/256$ if just one alternative value is allowed. Therefore with random, even error distribution, the true error rate and the measured one would differ by at most 6.25%, well within an appropriate level of accuracy in this context; furthermore in long term measurements it is possible to compensate for this difference.

Cell Swapping

As an alternative to modifying the contents of (idle) ATM cells, another method to cause a change in the data stream so as to allow symbol re-generation is to physically replace one ATM cell by another. For the reasons already identified, this will in general give rise to a large change in the encoded time-domain form of the symbol. This type of technique can be applied to any symbol where the data it carries includes the start (first header byte) of an ATM cell. Various possibilities are available:

(a) If the start of an idle cell was encoded in the original form of the symbol because no data cell was available for transmission as processing for that symbol was started, and if when the processing has been completed it is found that the encoded time-domain symbol should be re-generated, a check should be made as to whether a new data cell has become available; if so then the idle cell can be discarded and replaced with the data cell.

(b) If the total ATM cell stream being carried over the link contains cells with different ATM addresses in their headers (which form logically distinct streams based on the addresses) and if at the time when symbol regeneration is required a new cell with a different address from that of a cell starting in the originally encoded symbol is also available for transmission, then the two cells can be swapped and the symbol regenerated using the second cell. This should not normally be done if the first cell was marked as being of higher priority than the first, or if the first cell had been waiting to be transmitted for much longer than the second.

(c) If the line is currently running at well below full capacity, (i.e. there is a strong likelihood of inserting an idle cell in the near future, based on the state of the ATM cell buffering at the input to the transmit side of the modem) and if the current symbol, containing the start of a user data cell, is to be re-generated, then an idle cell may be substituted for that data cell, and the data cell replaced at the head of the queue of cells awaiting transmission. This type of change should be attempted only if all other methods are inapplicable, since it causes a delay to the cell's transmission. In addition it should not be used if the cell concerned is marked as high priority.

As shown above, there are a number of viable ways of implementing the invention for ADSL, while maintaining correct operation of the system as a whole, without requiring the receiver to have any knowledge of the process at all, and in a completely standards-compatible manner. Additionally, very minor changes to the standards-defined processing (such as the allowance at the receiver of one or a small number of alternative legitimate values for the bytes of an idle cell payload) usefully extend the range of possible options for symbol regeneration.

As mentioned above, although the above embodiment is descibed with reference to an ADSL system, the invention is not limited to ADSL, and indeed the ideas of the invention may be applied in any multiple tone signalling process.

The invention claimed is:

1. A modulation method for peak amplitude reduction in a transmitted data signal, the method comprising:
   storing input data in an intermediate data buffer;
   processing the input data through a plurality of intermediate processing stages to generate a data symbol;
   measuring a peak amplitude in the data symbol and comparing the measured peak amplitude in the data symbol to a threshold amplitude;
   if the measured peak amplitude in the data symbol is less than the threshold amplitude, then transmitting the data symbol; and
   if the measured peak amplitude in the data symbol exceeds the threshold amplitude, then reprocessing the input data stored in the intermediate data buffer through the plurality of intermediate processing stages to generate a reprocessed data symbol; and
   transmitting the reprocessed data symbol.

2. The method of claim 1, wherein the reprocessing step further comprises amending predetermined data bits of the input data stored in the intermediate data buffer without affecting input data reliability.

3. A method according to claim 2, wherein the input data includes a series of data frames having fast bytes or sync bytes, and the step of amending the input data includes amending the fast bytes or sync bytes.

4. A method according to claim 3, wherein the fast bytes or sync bytes have null values with at least one freely selectable bit, and the step of amending the predetermined data bits includes amending the at least one freely selectable bit of the fast bytes or sync bytes having null values.

5. A method according to claim 2, wherein the predetermined data bits include idle cells, and the step of amending the predetermined data bits includes amending at least one idle cell.

6. A method according to claim 5, wherein the step of amending the at least one idle cell includes selecting, for at least one payload byte in the at least one idle cell, an alternative idle cell payload byte value from a predetermined set of idle cell payload byte values, the number of values in said predetermined set being less than the total number of possible idle cell payload byte values.

7. A method according to claim 2, wherein the input data includes ATM cells, and the step of amending the predetermined data bits includes replacing an ATM cell with another ATM cell.

8. A method according to claim 7, wherein the step of amending the predetermined data bits includes replacing an idle ATM cell with a new data cell.

9. A method according to claim 7, wherein the step of amending the predetermined data bits includes swapping two ATM cells from different data streams.

10. A method according to claim 7, wherein the step of amending the predetermined data bits includes replacing a data ATM cell with an idle ATM cell.

11. A method according to claim 1, further comprising determining whether there is sufficient processing time to reprocess the input data stored in the intermediate data buffer before reprocessing that input data.

12. A method according to claim 1, wherein the plurality of intermediate processing stages includes a scrambling stage.

13. A computer program product for causing a data processor to carry out the steps of:
storing input data in an intermediate data buffer;
processing the input data through a plurality of intermediate processing stages to generate a data symbol;
measuring a peak amplitude in the data symbol and comparing the measured peak amplitude to a threshold amplitude;
if the measured peak amplitude in the data symbol is less than the threshold amplitude, then transmitting the data symbol; and
if the measured peak amplitude in the data symbol exceeds the threshold amplitude, then reprocessing the input data stored in the intermediate data buffer through the plurality of intermediate processing stages to generate a reprocessed data symbol; and
transmitting the reprocessed data symbol.

14. A computer program product according to claim 13, wherein the plurality of intermediate processing stages includes a scrambling stage.

15. A transmitter for transmitting multiple tones representing input data, comprising:
a processor having a plurality of intermediate processing stages for generating a data symbol, intermediate data being transmitted between each of the intermediate processing stages;
an intermediate data buffer for storing the intermediate data;
a symbol buffer for storing the data symbol;
a peak detector for detecting a peak amplitude in the data symbol and for comparing the peak amplitude in the data symbol with a threshold;
a regeneration control system configured to (i) amend predetermined intermediate data stored in the intermediate data buffer such that the input data is still represented by the amended intermediate data and (ii) subsequently reprocess the amended intermediate data stored in the intermediate data buffer through the intermediate processing stages to generate a reprocessed data symbol if the peak amplitude in the data symbol exceeds the threshold; and
an analogue front end for outputting the reprocessed data symbol.

16. The transmitter of claim 15, wherein the analogue front end is implemented on a separate chip.

17. The transmitter of claim 15, wherein the intermediate data includes a series of data frames including fast bytes or sync bytes and the predetermined intermediate data that is amended includes the fast bytes or sync bytes.

18. The transmitter of claim 17, wherein the predetermined intermediate data includes the fast bytes or sync bytes having null values with at least one freely selectable bit and the predetermined intermediate data that is amended includes the at least one freely selectable bit of the fast bytes or sync bytes having null values.

19. The transmitter of claim 15, wherein the predetermined intermediate data that is amended includes idle cells.

20. The transmitter of claim 19, wherein the regeneration control system is further configured to amend the predetermined intermediate data by selecting, for at least one payload byte in at least one idle cell, an alternative idle cell payload byte value from a predetermined set of idle cell payload byte values, the number of values in said predetermined set being much less than the total number of possible idle cell payload byte values.

21. The transmitter of claim 15, wherein the predetermined intermediate data that is amended includes ATM cells.

* * * * *